(12) United States Patent
Hill et al.

(10) Patent No.: US 10,962,730 B2
(45) Date of Patent: Mar. 30, 2021

(54) FIBER OPTIC PANEL WITH MOVEABLE CABLE SUPPORT ASSEMBLY AND CABLE-WINDABLE SUPPORT RODS

(71) Applicant: Clearfield, Inc., Minneapolis, MN (US)

(72) Inventors: John P. Hill, Oak Grove, MN (US); Todd M. Bade, Inver Grove Heights, MN (US); Brock A. Hill, Andover, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 16/729,826

(22) Filed: Dec. 30, 2019

(65) Prior Publication Data

US 2020/0209499 A1 Jul. 2, 2020

Related U.S. Application Data

(60) Provisional application No. 62/785,767, filed on Dec. 28, 2018.

(51) Int. Cl.
| | | |
|---|---|---|
| *G02B 6/44* | (2006.01) | |
| *H04Q 1/14* | (2006.01) | |
| *H04Q 1/02* | (2006.01) | |

(52) U.S. Cl.
CPC ........... *G02B 6/4452* (2013.01); *H04Q 1/023* (2013.01); *H04Q 1/141* (2013.01)

(58) Field of Classification Search
CPC ........ G02B 6/4452; G02B 6/09; H04Q 1/141; H04Q 1/023; H04Q 1/13; H04Q 1/06
See application file for complete search history.

(56) References Cited

U.S. PATENT DOCUMENTS

| | | | | |
|---|---|---|---|---|
| 2,677,510 | A * | 5/1954 | Osborne | A62C 33/04 242/405.2 |
| 2,932,465 | A * | 4/1960 | Johnson | A01K 89/0102 242/236 |
| 3,389,868 | A * | 6/1968 | Majkrzak | B65H 75/364 242/386 |
| 4,844,376 | A * | 7/1989 | Maraman, Sr. | B65H 49/305 242/129 |
| 4,884,863 | A * | 12/1989 | Throckmorton | G02B 6/4441 385/135 |
| 4,901,939 | A * | 2/1990 | Obst | B65H 75/18 242/118.4 |
| 5,109,983 | A * | 5/1992 | Malone | B65D 85/04 206/393 |

(Continued)

*Primary Examiner* — Andrew Jordan
(74) *Attorney, Agent, or Firm* — Troutman Pepper Hamilton Sanders LLP (57) ABSTRACT

A panel for storing a length of cable has a housing and a support assembly positioned in the housing and moveable with respect to the housing. The housing defines a housing space for storing the length of cable. The housing space is accessible through an opening. The support assembly is slidable through the opening between a stowed position inside of the housing space and a released position in which the support assembly is at least partially outside of the housing space. The support assembly has a pair of support rods that extend generally parallel to each other and are spaced by a distance, and a bracket connected to first ends of the support rods such that the support rods extend from the bracket and each have second ends that are free ends.

20 Claims, 12 Drawing Sheets

(56) References Cited

U.S. PATENT DOCUMENTS

| | | | | |
|---|---|---|---|---|
| 5,183,217 | A * | 2/1993 | Holler | B63B 21/04 242/128 |
| 5,193,756 | A * | 3/1993 | Chesler | B65H 49/02 242/593 |
| 6,643,444 | B1 * | 11/2003 | Putnam | G02B 6/4457 385/134 |
| 6,682,010 | B2 * | 1/2004 | Pohl | G02B 6/4479 242/386 |
| 7,072,560 | B1 * | 7/2006 | Bramson | G02B 6/4457 385/134 |
| 7,599,598 | B2 * | 10/2009 | Gniadek | B65H 49/20 385/100 |
| 7,769,265 | B2 * | 8/2010 | Cairns | G02B 6/4457 385/135 |
| 7,876,992 | B2 * | 1/2011 | Jensen | G02B 6/4457 385/135 |
| 8,121,456 | B2 * | 2/2012 | Gniadek | H02G 11/02 385/135 |
| 8,380,035 | B2 * | 2/2013 | Kowalczyk | G02B 6/4466 385/135 |
| 8,488,934 | B2 * | 7/2013 | Zhou | G02B 6/4454 385/135 |
| 8,488,935 | B2 * | 7/2013 | Brooks | H04B 10/25891 385/136 |
| 8,494,333 | B2 * | 7/2013 | Kowalczyk | G02B 6/4441 385/135 |
| 8,705,929 | B2 * | 4/2014 | Kowalczyk | G02B 6/4441 385/135 |
| 8,731,362 | B2 * | 5/2014 | Cairns | G02B 6/4401 385/135 |
| 10,545,305 | B2 * | 1/2020 | Leeman | G02B 6/4452 |
| 2003/0029956 | A1 * | 2/2003 | Pohl | G02B 6/4479 242/386 |
| 2004/0074852 | A1 * | 4/2004 | Knudsen | H04Q 1/021 211/26 |
| 2008/0037945 | A1 * | 2/2008 | Gniadek | B65H 49/20 385/135 |
| 2010/0034506 | A1 * | 2/2010 | Gniadek | B65H 49/20 385/135 |
| 2010/0329624 | A1 * | 12/2010 | Zhou | G02B 6/4454 385/135 |
| 2018/0306993 | A1 * | 10/2018 | Hill | G02B 6/4453 |
| 2020/0209499 | A1 * | 7/2020 | Hill | G02B 6/4452 |

\* cited by examiner

FIBER OPTIC PANEL WITH MOVEABLE CABLE SUPPORT ASSEMBLY AND CABLE-WINDABLE SUPPORT RODS

TECHNICAL FIELD

The present disclosure relates generally to fiber optic management systems, and more specifically to modular fiber optic panels having one or more moveable cable support assemblies.

BACKGROUND

Data, voice, and other communication networks are increasingly using fiber optics to carry information. In a fiber optic network, each individual fiber is generally connected to both a source and a destination device. Fiber optic connection apparatuses, such as outside plant distribution cabinets, distribution frames, pedestals, patch panels, and splice terminations are used wherever the interconnection or cross-connection of multiple fibers optic cables is required. For example, fiber optic cable comprising numerous individual fibers may enter a distribution cabinet, fiber frame, or patch panel for connection to the individual optical fibers that split off to provide service to homes or businesses through a connection panel having a plurality of connection ports. Often, it is desirable that such fiber optic management, and/or fiber optic connection apparatus allow for the interconnection of a large number of individual fibers in as small a space as possible (e.g., high density connections), while enabling storage of a significant length of cable slack. It is further desirable to reduce space requirements and deployment costs related to fiber optic management systems.

SUMMARY

In some embodiments, the present disclosure describes a panel for storing a length of cable. The panel includes a housing defining a housing space for storing the length of cable and at least one support assembly. The housing includes an opening providing access to the housing space. The at least one support assembly is configured to be positioned in the housing space and is slidable through the opening between a stowed position inside of the housing space and a released position in which the at least one support assembly is at least partially outside of the housing space. The at least one support assembly includes a pair of support rods that extend generally parallel to each other and are spaced by a distance. The at least one support assembly also includes a bracket connected to first ends of the support rods such that the support rods extend from the bracket and each have second ends that are free ends.

In another embodiment, the present disclosure describes a cable support assembly. The cable support assembly includes a connection panel including a plurality of connection ports, a pair of support rods that extend generally parallel to each other and are spaced by a distance, a bracket connected to first ends of the support rods such that the support rods extend from the bracket and each have second ends that are free ends, the connection panel being mounted to the bracket, and a fiber optic cable alternatingly wound around the pair of support rods to span the distance between the support rods with every winding, the fiber optic cable being operatively connected to the plurality of ports.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The present disclosure describes a fiber optic panel including a housing for a length of fiber optic cable and at least one movable support assembly for storing and supporting the cable and retaining the cable slack within the housing. The movable support assembly may be slidable in and out of the housing to expose at least a portion of the support assembly and the supported cable. The fiber optic panel may be modular in form for attachment to a frame, such as a frame in a data room or communications center.

The movable support assembly may include a pair of support rods that are spaced apart and extend parallel to each other. The support rods may be each connected to a common bracket to form the movable support assembly. The bracket may be configured to accept a fiber optic connection panel, such as a standard or customized multi-port connection panel. The support assembly may retain a length of cable that is alternatingly wound around the support rods. The cable may be operatively connected to the connection panel for providing a fiber optic connection functionality to the fiber optic panel.

The configuration of the fiber optic panel may enable storage and retention of a significant length of cable within a low-profile housing. Moreover, the configuration of the fiber optic panel may enable multiple support assemblies within the same housing, thus allowing for storage of multiple wound cables in the same modular panel. The movable support assembly may allow the any portion of the length of cable to be easily unwound from support rods and drawn to a desired connection location.

Figure 1:
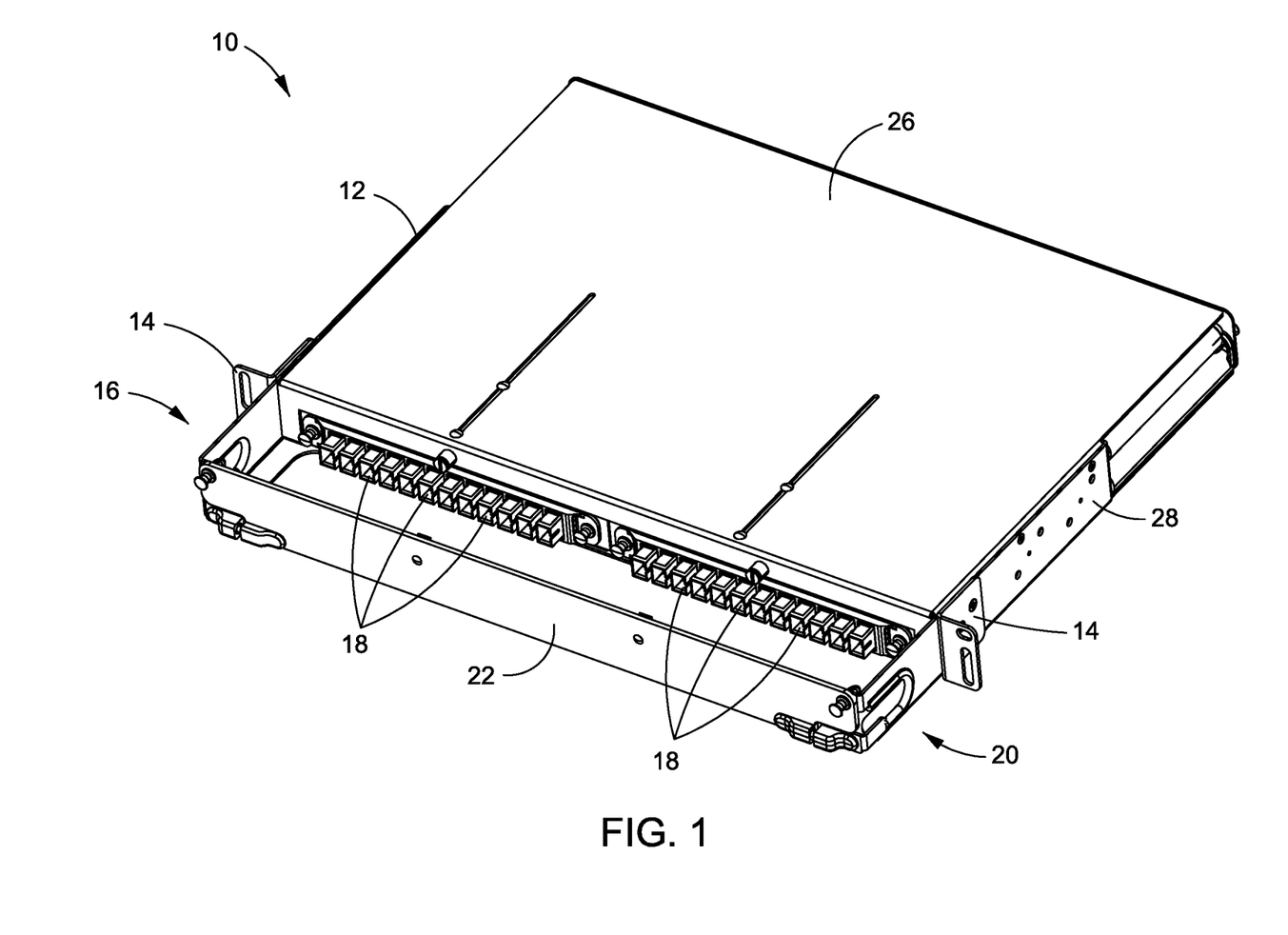
FIG. 1 is a perspective view of an exemplary assembled fiber optic panel, according to an embodiment.
Figure 2:
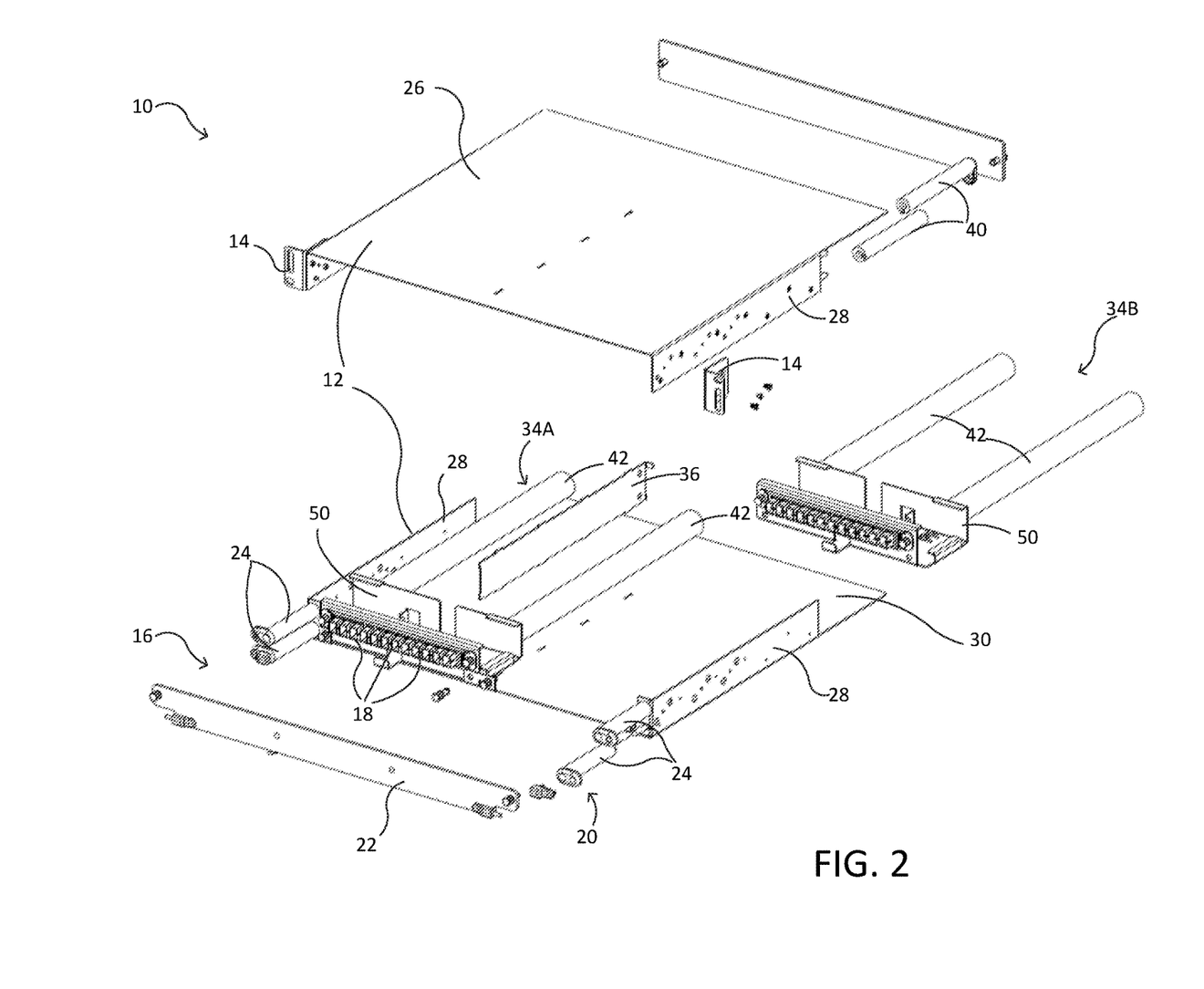
FIG. 2 is an exploded view of the panel, further depicting exemplary components.
Figure 3:
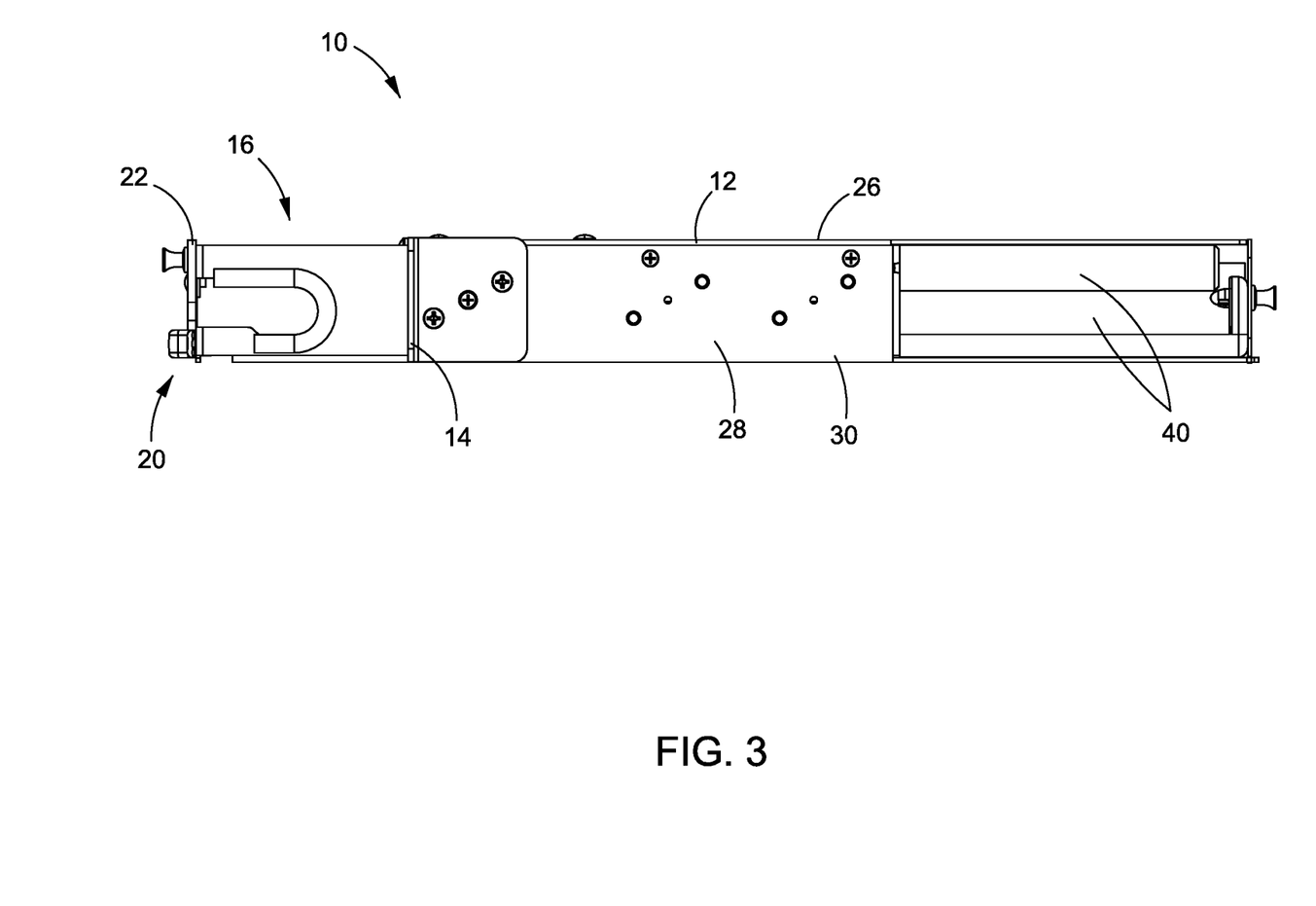
FIG. 3 is a side view of the panel.

FIG. 1 is a perspective view of an exemplary assembled fiber optic panel 10. FIG. 2 is an exploded view of the panel 10, further depicting the exemplary components. FIG. 3 is a side view of the panel 10. While the panel 10 is referred to herein as a fiber optic panel, it should be understood that features of the disclosed device may be applied to other similar environments and is not necessarily limited to fiber optics. For example, the panel 10 may be associated with other connection or communication systems, such as coaxial, Ethernet, electrical, telephone, etc. The panel 10 may be formed as a modular component with a size and shape configured to enable attachment of the panel 10 to a support system (not shown). For example, the panel 10 may include a housing 12 that is generally rectangular and include support brackets 14 for attachment to a support frame (e.g., a frame that may be found in a data room as part of a fiber optic network). The shape and size of the panel 10 is not limited to the illustrated shape and size, however, and could include other configurations that allow for attachment to other support systems, such as cabinets, surfaces, walls, poles, or any other support system that may be associated with a cable or otherwise wired connection.

The panel 10 may include a front-end connection assembly 16 configured to provide space and functionality for one or more fiber optic connections. For example, the front-end connection assembly 16 may include a plurality of ports 18 positioned at a front of the housing 12 and a door assembly 20 at least partially protecting the plurality of ports 18. The door assembly 20 may include, for example, a door 22 and a plurality of door supports 24 extending outwardly from the housing 12 and forming a space for receiving one or more cables of other wired connectors to be secured to one or more of the ports 18. The door 22 may be at least partially removably attached to the door supports 24, such as, for example, by one or more hinged, threaded, or snap-on connectors. The door 22 may thus be removed to provide access to the plurality of ports 18 for connecting to one or more elements in a fiber optic network.

The housing 12 is positioned adjacent to the plurality of ports 18 and provides an enclosure for storing a length of fiber optic cable operably connected to the plurality of ports 18. The housing 12 may be fabricated from any suitable material, such as a plurality of interconnected sheet metal plates (e.g., aluminum). For example, the housing 12 may include a top plate 26, a pair of side plates 28, and a bottom plate 30. As shown, the side plates 28 may be formed as flanges that extend perpendicular from the top plate 26 and the bottom plate 30 and overlap. However, it should be understood that the side plates 28 may be individual components that extend from only one of the top plate 26 or bottom plate 30, or which are separate elements that are attached to the top plate 26 and bottom plate 30. The side plates 28 may be relatively narrow in order to provide a housing 12 that includes a depth that is much smaller than a length and width. The housing 12 thus has a low-profile configuration. Disclosed embodiments are not limited to these relative sizes and shapes, however, and other embodiments could include, for example, larger side plates 28 to provide a deeper or squarer housing 12.

Figure 4:
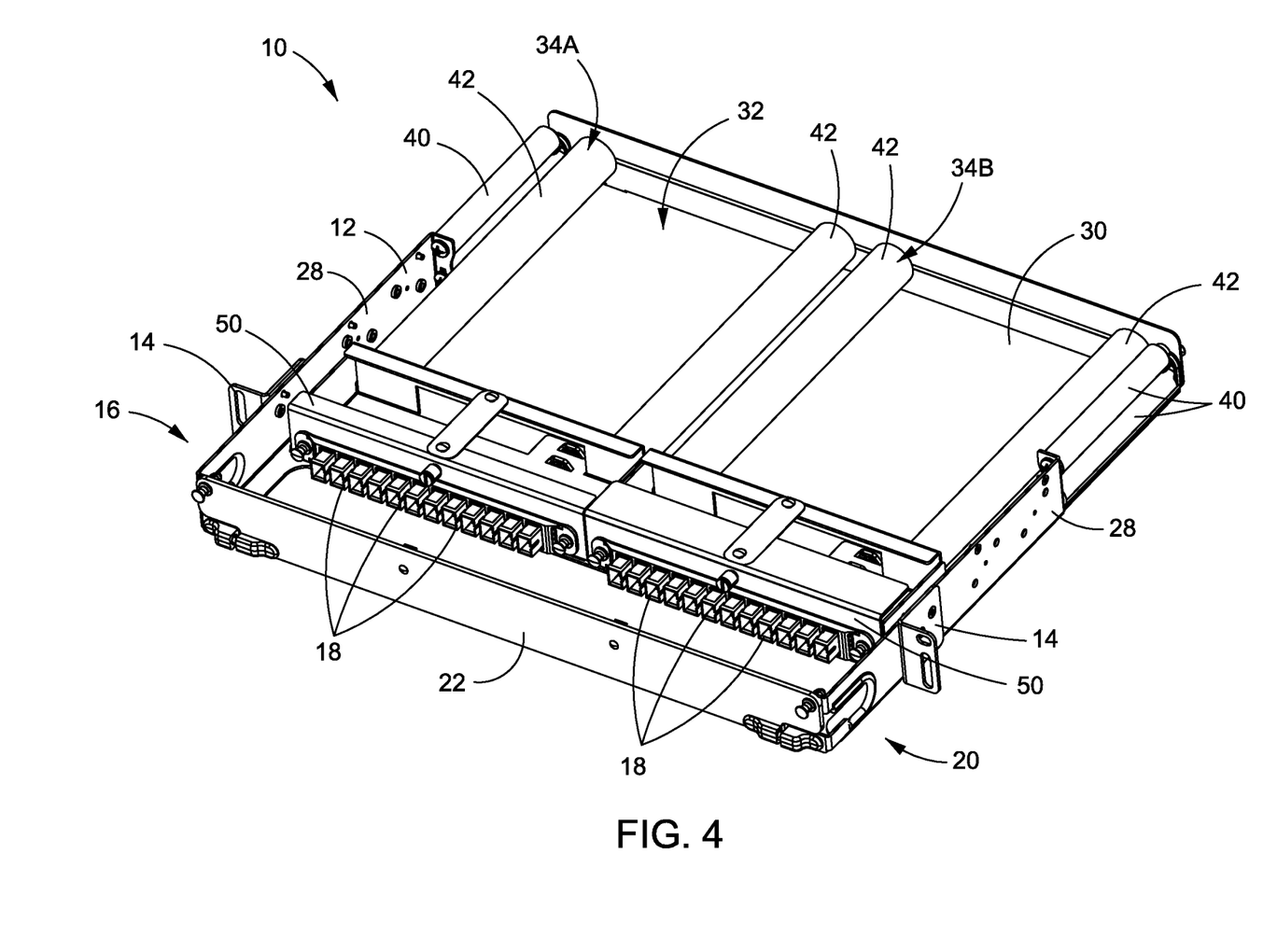
FIG. 4 is a perspective view of the panel, with a top plate removed and exposed internal components, including a pair of support assemblies in a stowed position.

FIG. 4 is a perspective view of the panel 10 with the top plate 26 removed, exposing a housing space 32. The panel 10 may further include at least one support assembly 34A, 34B, with two being shown and described in the figures. A partition plate 36 may be positioned between the support assemblies 34A, 34B, thereby forming separate spaces within the housing space 32 for the respective support assemblies 34A, 34B. The housing 12 may further include a rear door 38 configured to cover and provide access to the housing space 32. The rear door 38 may be removable, as will be described.

In some embodiments, the housing 12 may further include one or more extension rods 40 secured to an end of one of the side plates 28 and extending to an end of the top plate 26 and bottom plate 30, thereby forming at least a portion of the enclosure that defines the housing space 32. In one embodiment a pair of extension rods 40 may be secured to each side plate 28. The rear door 38 may be removably attached to the extension rods 40 to selectively provide access to the housing space through an opening (when removed) and complete the enclosure of the housing space 32 (when in place). Alternative embodiments may omit the extension rods 40 and allow the side plates 28 to extend the same length as the top plate 26 and bottom plate 30.

Figure 5:
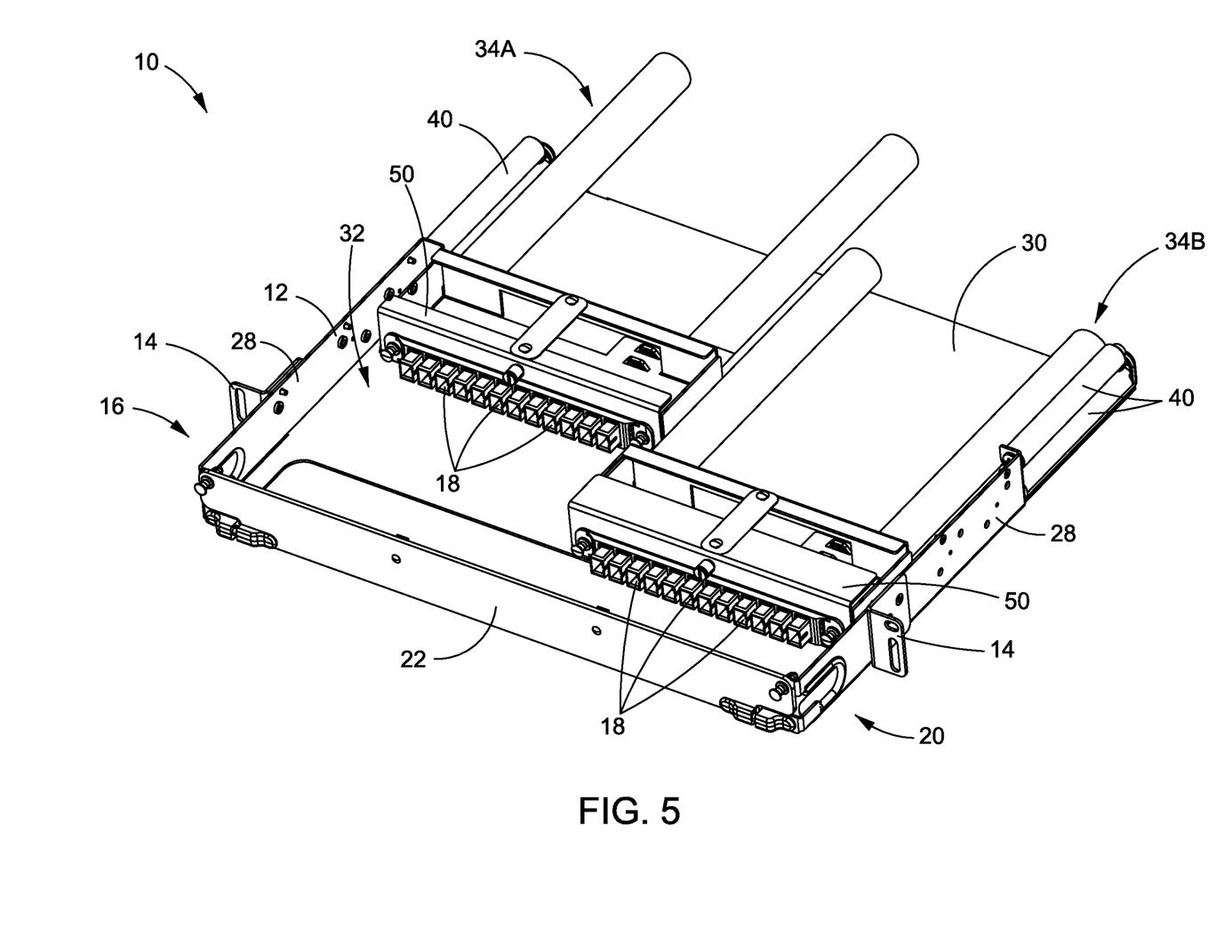
FIG. 5 is the perspective view of FIG. 4, with one of the support assemblies moved to a released position.

FIG. 5 is a perspective view of the panel 10 with the top plate 26 and the rear door 38 removed, and the support assembly 34A being moved partially out of the housing space 32 through sliding movement in a rear direction. Each support assembly 34A, 34B is movable in this manner to expose at least a portion of the respective support assembly 34A, 34B outside of the housing 12. In FIG. 5, the support assembly 34A may be considered as being in a released position while the support assembly 34B may be considered as being in a stowed position. The support assemblies 34A, 34B are preferably independently movable, but could selectively connected to move in tandem. Each support assembly 34A, 34B may move freely within a respective portion of the housing space 32 and may optionally include one or more bearings or guides to enhance, control, and/or limit movement thereof.

Figures 6, 7:
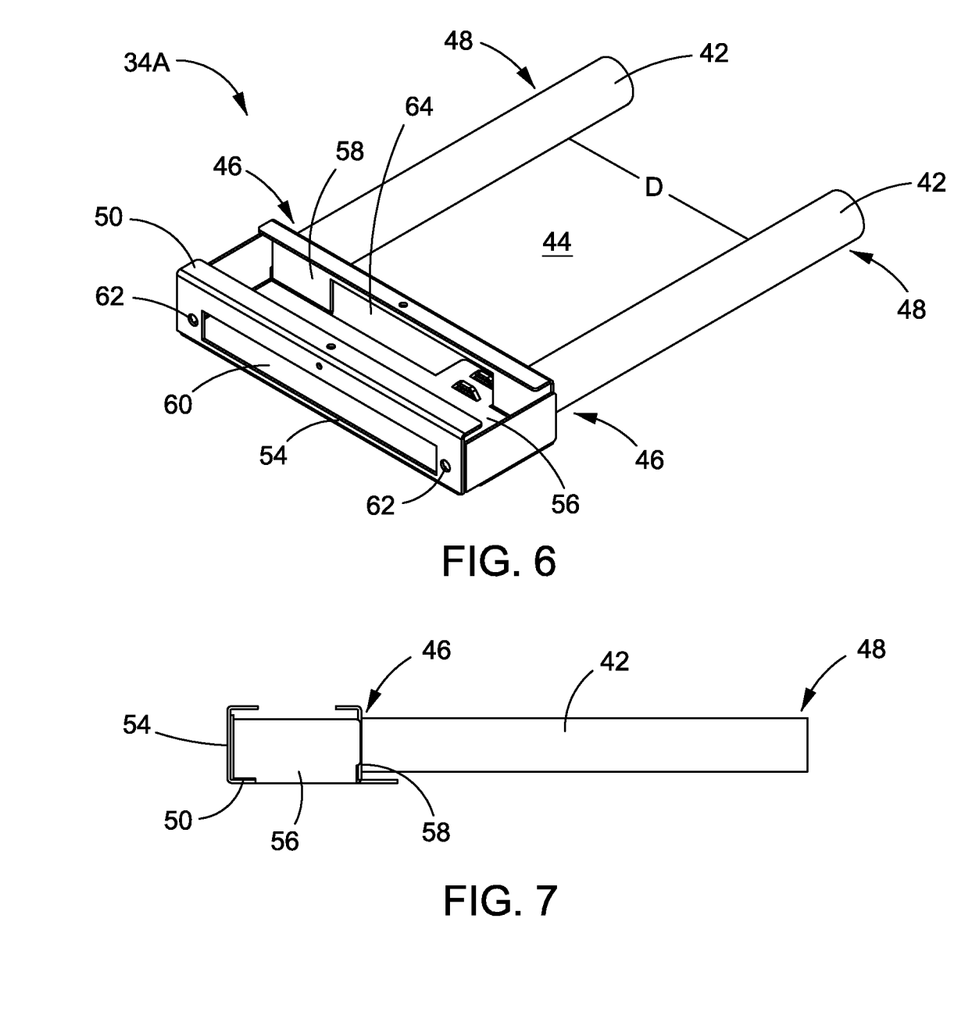
FIG. 6 is a perspective view of an exemplary support assembly, according to an embodiment.
FIG. 7 is a side view of the support assembly.

FIG. 6 is a top perspective view of the support assembly 34A. FIG. 7 is a side view of the support assembly 34A. While support assembly 34A is described with respect to FIGS. 6 and 7, it should be understood that the description may equally apply to support assembly 34B. The support assembly 34A may include a pair of support rods 42 that are spaced from each other and extend parallel to each other. The support rods 42 may be positioned a distance D from each other and thereby form a space 44 therebetween. The support rods 42 may extend longitudinally (e.g., have a length at least three times a width or diameter thereof). Each support rod 42 may be cylindrical, but embodiments are not limited to any particular cross-sectional shape. Each support rod 42 may include a first end 46 and a second end 48. Each first end 46 of each support rod 42 may be secured to a bracket 50. Each second end 48 may be a free end. The bracket 50 may span at least the distance D and rigidly attach to the support rods 42 to maintain the distance D between them.

The bracket 50 may include a general U-shape with a front wall 52, a bottom wall 54, and a rear wall 56 forming a space 58 therebetween. The support rods 42 may be secured to the rear wall 56 and extend rearward therefrom. The front wall 52 may include a window 60 for receiving the plurality of ports 18. The front wall 52 may also include one or more holes 62 for receiving a fastener. The rear wall 56 may include an aperture 64 for receiving a portion of a cable or other connector.

The combination of the support rods 42 and bracket 50 form the support assembly 34A that fits within at least a portion of the housing space 32 and is configured to slide in and out thereof (e.g., similar to a drawer). The support rods 42 create a mechanism for the winding of significant length of cable, as will be described in more detail. The bracket 50 provide structural rigidity to the support assembly 34A and also provides the space 58 for accommodating a portion of the cable that connects to the plurality of ports 18. Moreover, the bracket 50 provides a convenient mounting location for a connection panel that includes the plurality of ports 18.

Figure 8:
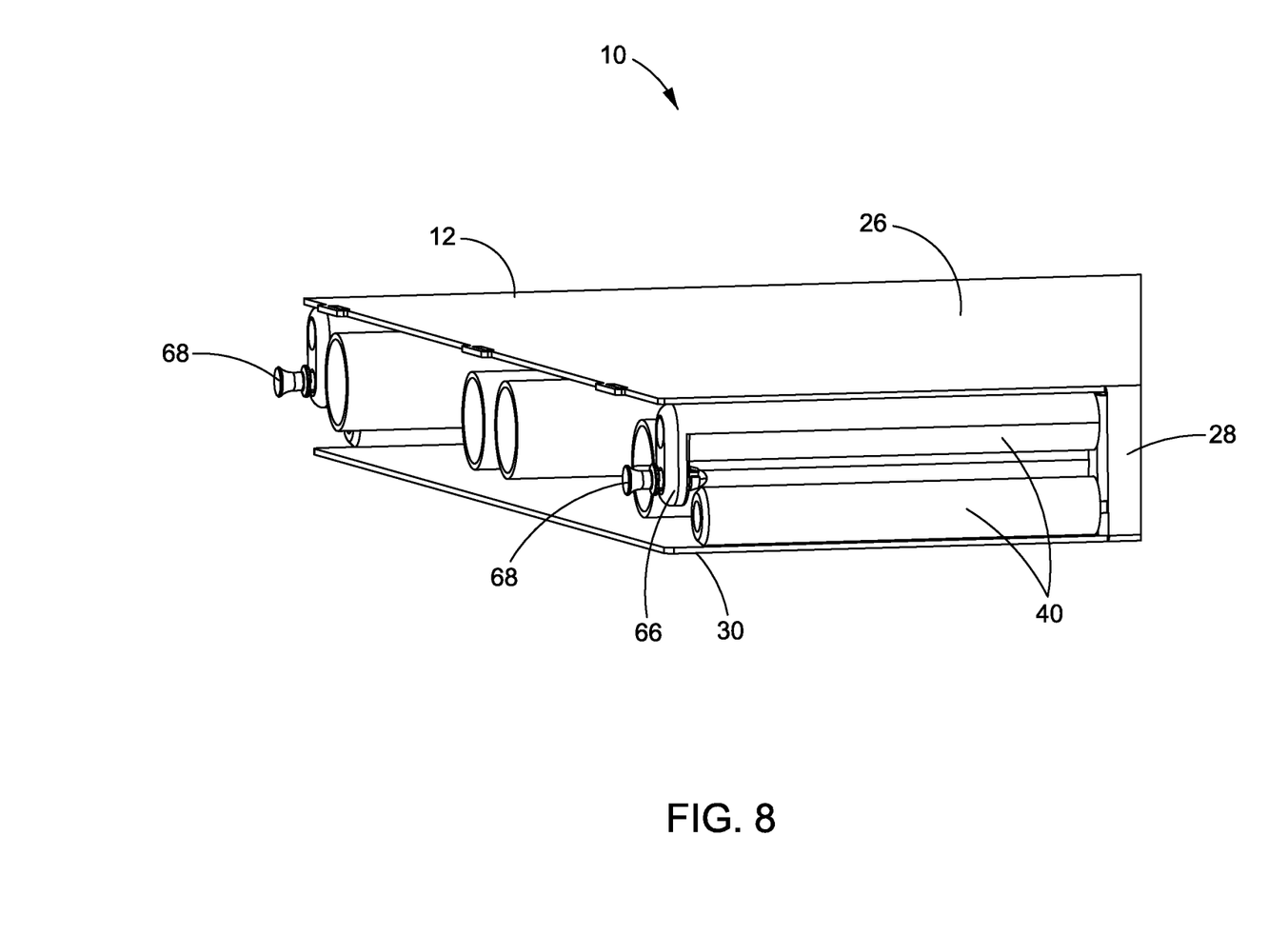
FIG. 8 is a close-up view of a rear door of a housing of the panel.

FIGS. 8-11 further illustrate features of the panel 10 that enable and/or enhance the movable functionality of the support assemblies 34A, 34B. FIG. 8 further illustrates the rear door 38 in position to close the housing space 32 within the housing. In an exemplary embodiment one of the extension rods 40 of each pair on opposite sides of the rear door 38 include a connector 66 that abuts the rear door 38. The connector 66 may include (or be) an aperture that receives a portion of a fastener 68 that extends through the rear door 38 to secure the rear door 38 to the extension rods 40 (and thus the rest of the housing 12). The fastener 68 may be threaded or held by a snap or biased connection. In some embodiments, the rear door 38 may be hingedly connected to a portion of the housing 12 (e.g., the top plate 26, bottom plate 30, extension rods 40, etc.). The fastener 68 may be removed to allow the rear door 38 to be removed (or at least moved) to expose the housing space 32 and allow the support assemblies 34A, 34B to slide rearward (or be inserted into the housing space 32).

Figure 9:
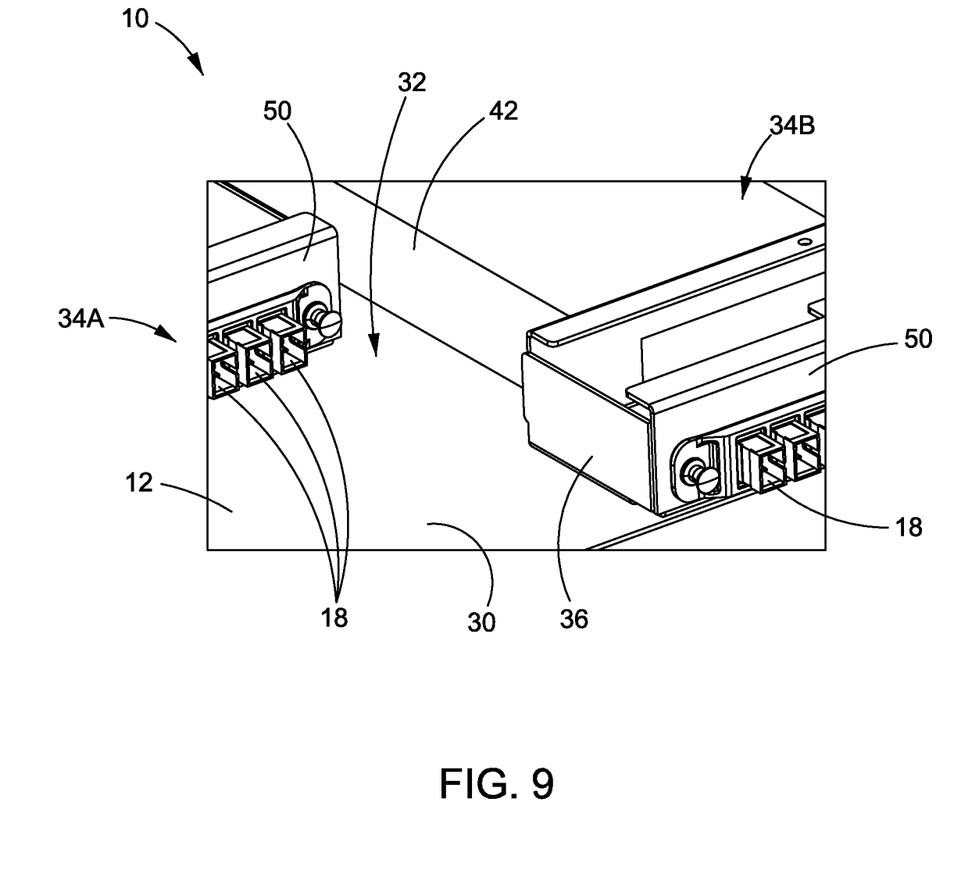
FIG. 9 is a close-up of a front end of the housing of the panel.

FIG. 9 Illustrates a front end of the housing 12 with the support assembly 34A in a released position and the support assembly 34B in the stowed position. In an exemplary embodiment, a flange 70 may be attached to the housing 12. For example, the flange 70 may extend upwardly from the bottom plate 30. The flange 70 may accommodate fasteners 72 that are configured to be inserted into holes 62 to secure the bracket 50 to the flange 70 (and thus immobilize the respective support assembly 34A, 34B. While fasteners 72 and holes 62 are illustrated, it should be understood that other types of releasable connectors are possible. For example, the flange 70 may support a magnet that is releasably securable to the bracket 50 or another magnet mounted on the bracket 50.

Figure 10:
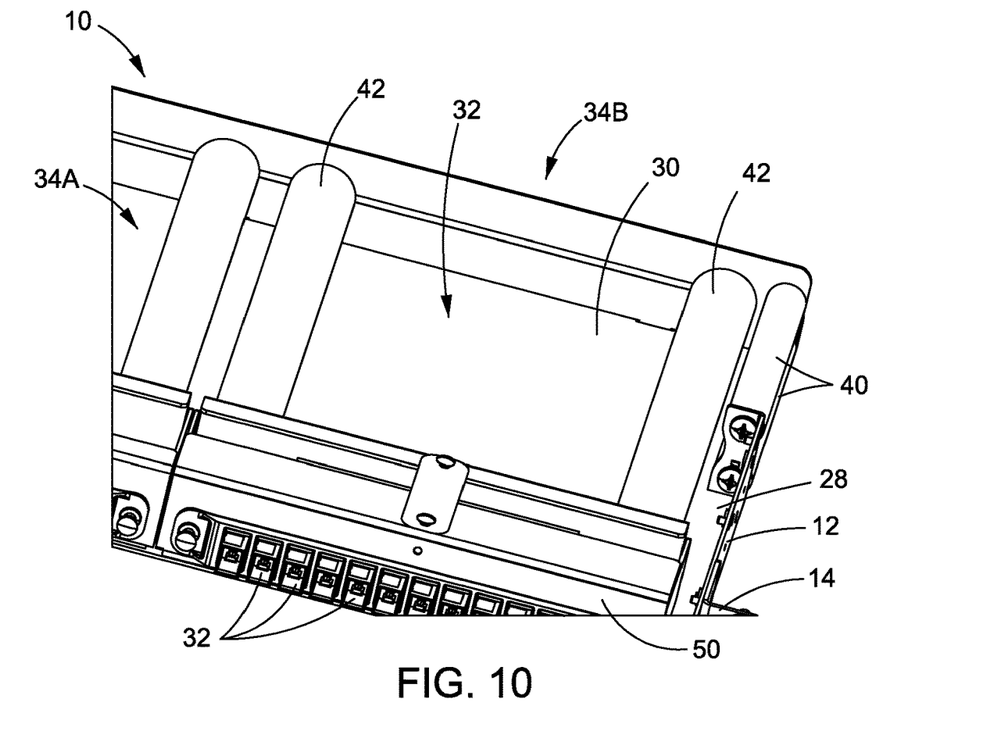
FIG. 10 is a close-up view of a support assembly of the panel in a stowed position.
Figure 11:
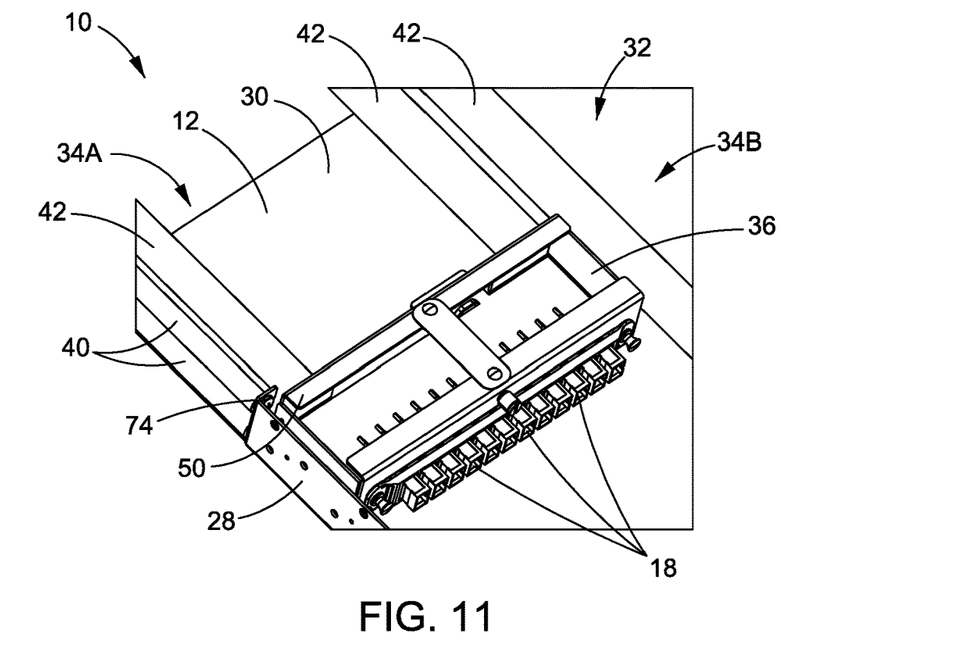
FIG. 11 is a close-up view of a support assembly of the panel in a released position.

FIGS. 10 and 11 illustrate a close-up view of the support assemblies 34A, 34B inside of the housing 12. In FIG. 10 both support assemblies 34A, 34B are positioned inside of the housing space 32, in the stowed position. In FIG. 11 the support assembly 34A has been moved to a release position. In an exemplary embodiment, a front end 74 of the extension rods 40 may act as a stop that limits further movement of a respectively adjacent support assembly 34A, 34B out of the housing 12. For example, the extension rods 40 may be sized such that the front end 74 extends into the housing space 32 and abuts the rear wall 56 when the respective support assembly 34A, 34B has been fully moved to a release position. This stop feature helps to prevent the entire support assembly 34A, 34B from being inadvertently removed from the housing 12 (e.g., the stop prevents the support assembly 34A, 34B from falling out of the housing 12 due to gravity). In some embodiments, the partition plate 36 may include a tab 76 that additionally or alternatively serves as a stop for a respectively adjacent support assembly 34A, 34B.

Figure 12:
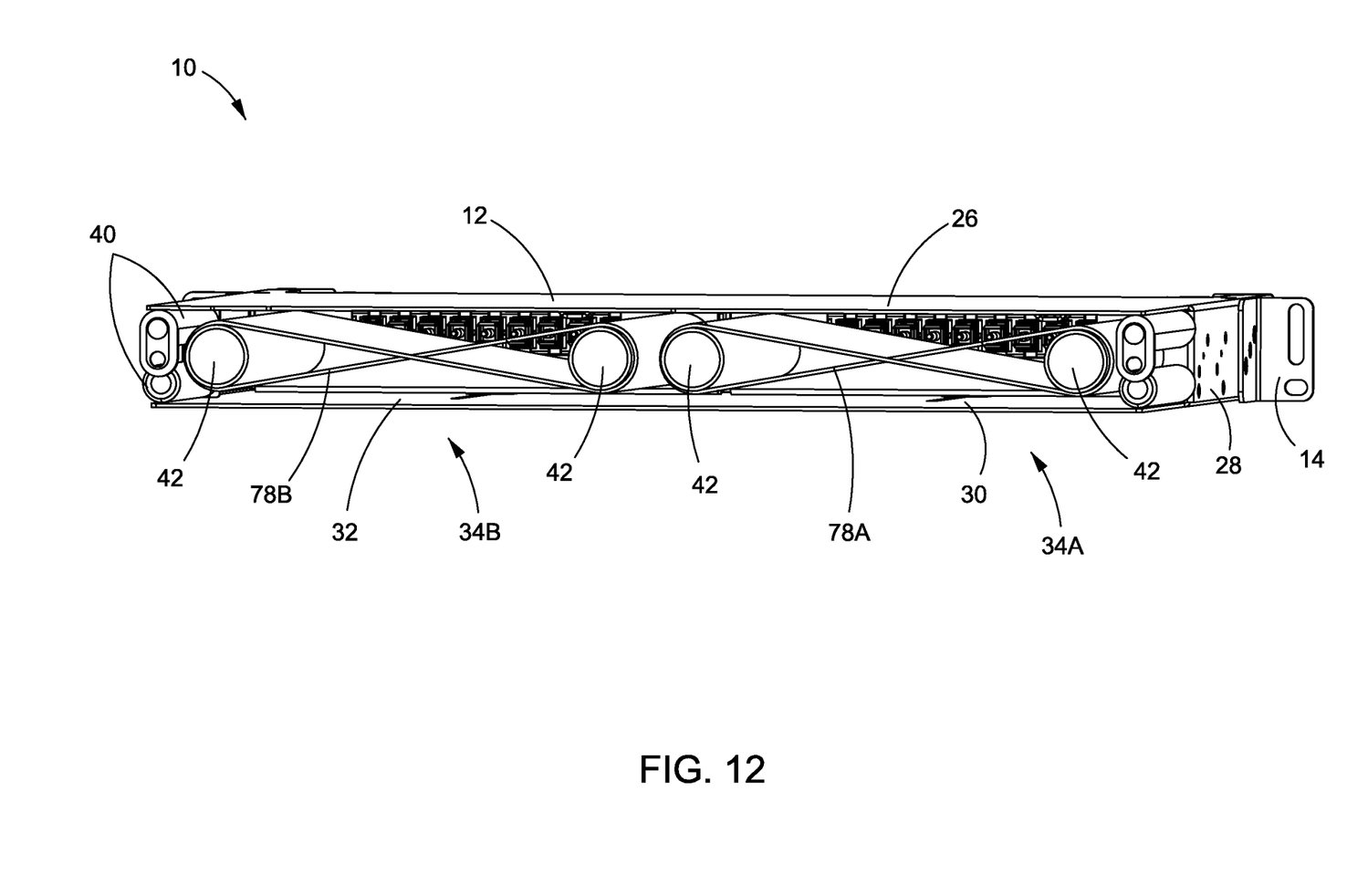
FIG. 12 is a rear view of the panel including two support assemblies in stowed positions and cables wound around the support assemblies, according to an embodiment.
Figure 13:
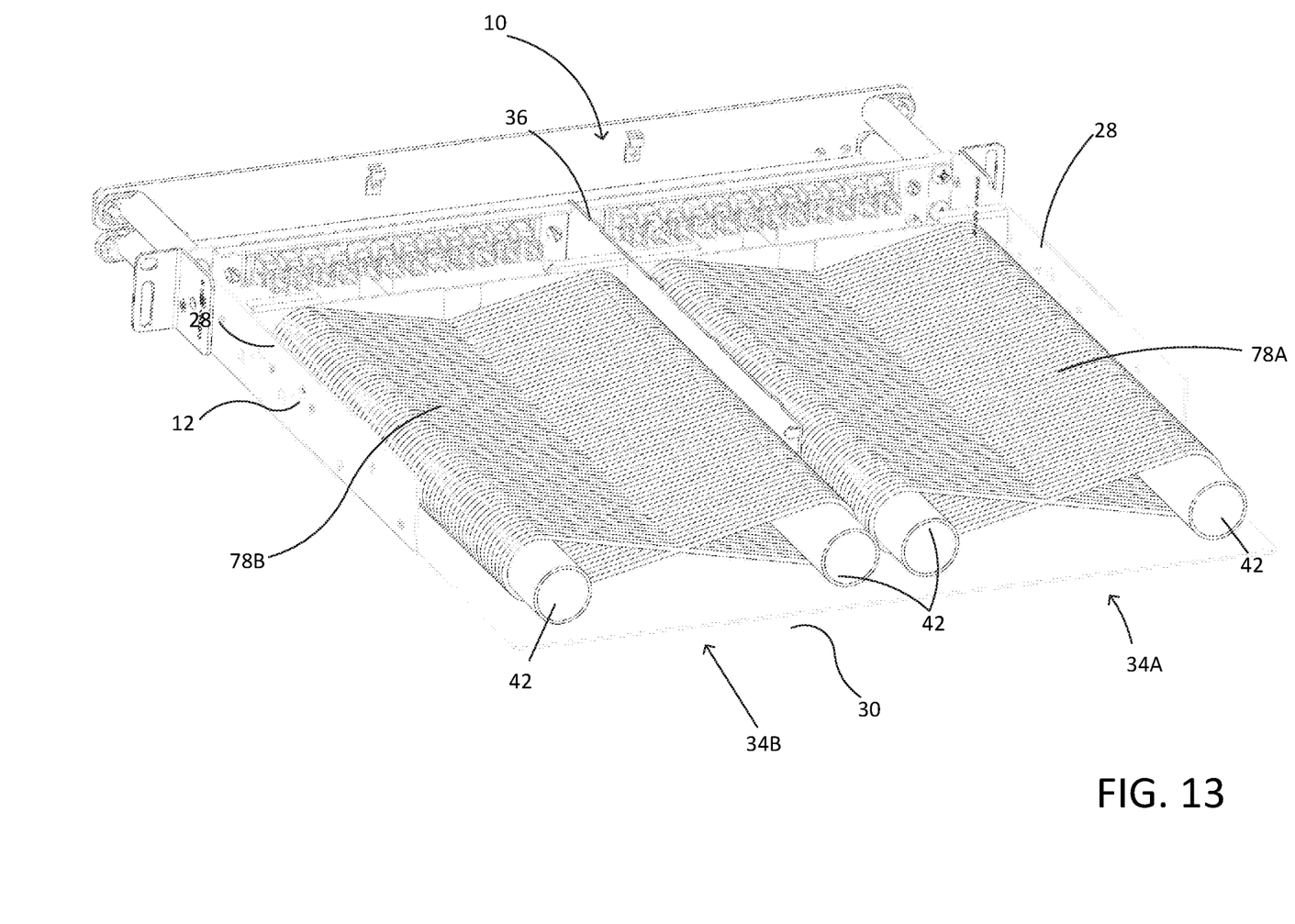
FIG. 13 is a perspective view of an opened panel and a pair of support assemblies in stowed positions, each having a cable wound around the respective support assembly.
Figure 14:
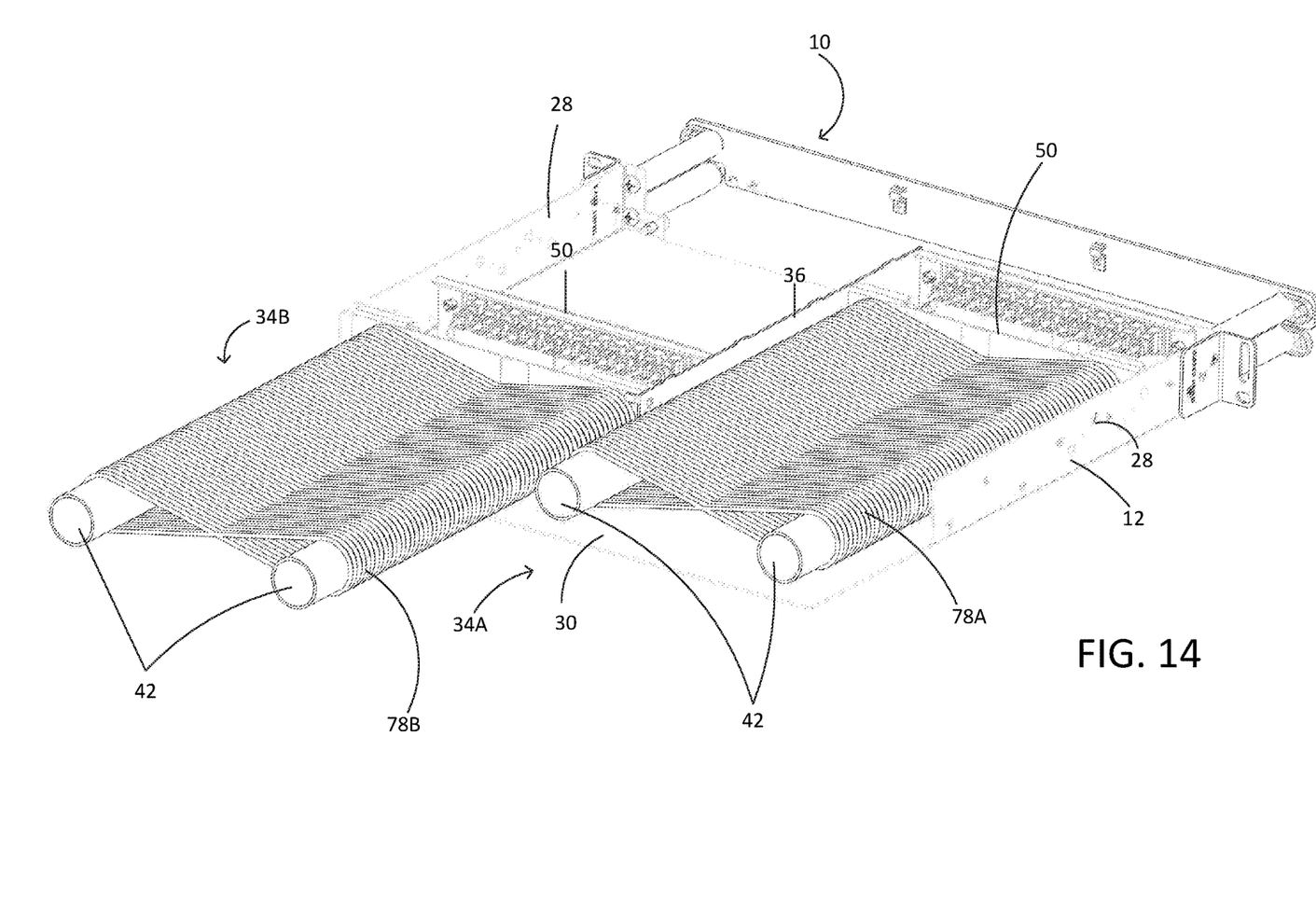
FIG. 14 is a perspective view of the opened panel of FIG. 13, with one of the support assemblies and its respective cable being moved to a released position.

FIGS. 12-14 depict the support assemblies 34A, 34B with a respective length of cable 78A, 78B mounted thereon. For example, the cable 78A is alternatingly wound around the pair of support rods 42 such that the cable 78A is stored on the support assembly 34A and spans the distance D between the support rods 42 with every winding. For example, in order to wind the cable 78A onto the support rods 42, a free end may be looped around an outside of a first of the support rods 42 (extending, for example, clockwise around the outside) and then span the distance D between the support rods before extending around an outside of a second of the support rods 42 (extending, for example counter-clockwise around the outside), with this process repeated, slowly moving the cable 78A rearward on the support rods 42 until a desired length has been wound. The cable 78A may be easily unwound by pulling the cable in a direction generally parallel to the support rods 42. The cable 78B may be similarly wound around the support rods 42 of the support assembly 34B.

In an alternative embodiment, a cable guide may be positioned between the support rods 42 to guide movement of the cable 78A off of the support rods 42 regardless of the direction from which the cable 78A is pulled. For example, the cable guide may allow a user to pull the cable in a direction perpendicular to the support rods 42 to unwind the cable 78A.

The disclosed panel is configured as a modular storage device for housing a length of cable (or multiple lengths of cable, depending on the number of support assemblies). The panel and features of the panel are particularly applicable for use with a server or computing frame that is part of a data room, communications center, or other computing environment, especially those that utilize relatively long lengths of fiber optic cable. The modular structure enables a user to customize the panel to desired specifications and features. For example, the size and shape of the housing is not limited and can be configured to accommodate any number of support assemblies for individual cables. Moreover, the support assemblies themselves may be customized, such as to accommodate different lengths of cable, different connection panels having desired ports or other connectors. For example, the length of the support rods 42 and distance D may be selected to accommodate a selected length of cable.

The panel 10 may be manufactured with the housing 12 and support assemblies 34A, 34B as separate components with the support assemblies 34A, 34B later inserted into the housing space. The lengths of cable 78A, 78B may be wound around the support rods 42 of the respective support assembly 34A, 34B prior to installation of the support assemblies 34A, 34B. In other embodiments, the support assemblies 34A, 34B may be moved to the release position in order to allow the cables 78A, 78B to be mounted and connected to the plurality of ports 18.

In use, the panel 10 may be mounted to a frame or other support structure in the vicinity of other devices that may operate in conjunction with a cable, such as a fiber optic cable 78A, wound around the support rods 42 of the support assembly 34A and stored in the housing 12 of the panel 10. The rear door 38 may be removed and the fasteners 72 disconnected to allow the support assemblies 34A (or 34B) to move rearward out of the housing space 32. A user may selectively unwind a desired length of cable 78A from the support rods 42 and connect the free end one of the other devices in the vicinity (e.g., another fiber optic network component on the frame). The user may then return the support assembly 34A to the stowed position. In the stowed position, the user may make one or more connections to one or more of the plurality of ports 18, thereby completing a connection through the cable 78A.

The disclosed panel thus provides a modular storage system that allows for a wired connection between to network components. The configuration of the support assemblies and winding pattern of the cable enable a significant length of cable to be stored in a relatively small area, while still being easily accessed and unwound for use. Moreover, the modular and customizable features of the panel allow a variety of panels to be produced depending on the environment and requirements of the situation.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The terms "front," "side," "rear," "top," "bottom," "back," and associated directions (e.g., forward, rearward) are not limiting as to the absolute position of any associated element but help to define relative positions of at least some components, as well as directions of travel. It should be understood that disclosed embodiments are not limited to any particular position or direction based on these terms.

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiment.

The invention claimed is:

1. A panel for storing a length of cable, the panel comprising:
    a housing defining a housing space for storing the length of cable, the housing comprising an opening providing access to the housing space; and
    at least one support assembly configured to be positioned in the housing space and being slidable through the opening between a stowed position inside of the housing space and a released position in which the at least one support assembly is at least partially outside of the housing space, the at least one support assembly comprising:

a pair of support rods that extend generally parallel to each other and are spaced by a distance; and a bracket connected to first ends of the support rods such that the support rods extend from the bracket and each have second ends that are free ends.

2. The panel of claim 1, further comprising brackets on opposing sides of the housing for attachment to a support frame.

3. The panel of claim 1, further comprising a front end connection assembly mounted to the housing.

4. The panel of claim 3, wherein the front end connection assembly comprises a door.

5. The panel of claim 1, further comprising a plurality of connection ports mounted in the housing.

6. The panel of claim 5, wherein the plurality of connection ports are mounted on a connection panel, the connection panel being mounted to the bracket of the at least one support assembly.

7. The panel of claim 6, wherein the bracket comprises a window for receiving the connection panel.

8. The panel of claim 1, wherein the bracket comprises a general U-shape.

9. The panel of claim 8, wherein the bracket comprises a front wall, a bottom wall, and a rear wall, wherein the front ends of the support rods are attached to the rear wall.

10. The panel of claim 9, wherein the rear wall includes an aperture for receiving a portion of a cable or a connector.

11. The panel of claim 1, wherein the support rods are cylindrical.

12. The panel of claim 1, wherein the housing comprises a top plate, a bottom plate, and a pair of side plates.

13. The panel of claim 12, wherein the top plate and the bottom plate are rectangular.

14. The panel of claim 12, further comprising a removable door configured to selectively close the opening into the housing space.

15. The panel of claim 14, wherein the housing further comprises a plurality of extension rods extending from the side plates and connecting the housing to the removable door.

16. The panel of claim 15, wherein a front end of the extension rods is a stop to limit sliding motion of the at least one support assembly out of the housing.

17. The panel of claim 1, wherein the at least one support assembly comprises a plurality of support assemblies.

18. The panel of claim 17, wherein the housing further comprises a partition plate in the housing space and separating the plurality of support assemblies.

19. The panel of claim 1, further comprising a length of cable alternatingly wound around the pair of support rods to span the distance between the support rods with every winding.

20. A cable support assembly, the support assembly comprising:

a connection panel comprising a plurality of connection ports;

a pair of support rods that extend generally parallel to each other and are spaced by a distance; and a bracket connected to first ends of the support rods such that the support rods extend from the bracket and each have second ends that are free ends, the connection panel being mounted to the bracket; and a fiber optic cable alternatingly wound around the pair of support rods to span the distance between the support rods with every winding, the fiber optic cable being operatively connected to the plurality of ports.

* * * * *